United States Patent
Winkelvos et al.

(10) Patent No.: US 11,510,051 B2
(45) Date of Patent: Nov. 22, 2022

(54) DEVICES, METHODS, AND COMPUTER PROGRAM FOR RELEASING TRANSPORTATION VEHICLE COMPONENTS, AND VEHICLE-TO-VEHICLE COMMUNICATION MODULE

(71) Applicant: VOLKSWAGEN AKTIENGESELLSCHAFT, Wolfsburg (DE)

(72) Inventors: Timo Winkelvos, Sickte (DE); Alexander Tschache, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 98 days.

(21) Appl. No.: 16/771,249

(22) PCT Filed: Dec. 5, 2018

(86) PCT No.: PCT/EP2018/083641
§ 371 (c)(1),
(2) Date: Jun. 10, 2020

(87) PCT Pub. No.: WO2019/115312
PCT Pub. Date: Jun. 20, 2019

(65) Prior Publication Data
US 2021/0176631 A1    Jun. 10, 2021

(30) Foreign Application Priority Data
Dec. 15, 2017    (DE) ..................... 10 2017 222 882.2

(51) Int. Cl.
*H04W 12/037* (2021.01)
*H04W 4/46* (2018.01)
(Continued)

(52) U.S. Cl.
CPC .......... *H04W 12/037* (2021.01); *B60R 25/01* (2013.01); *H04W 4/46* (2018.02); *H04W 12/06* (2013.01);
(Continued)

(58) Field of Classification Search
CPC . H04W 12/037; H04W 12/106; H04W 12/71; H04W 12/06; H04W 4/46;
(Continued)

(56) References Cited

U.S. PATENT DOCUMENTS 9,685,013 B2    6/2017    Nair
9,916,151 B2    3/2018    Ye et al.
(Continued)

FOREIGN PATENT DOCUMENTS

CN    101350725 A    1/2009
CN    101561943 A    10/2009
(Continued)

OTHER PUBLICATIONS

Search Report for International Patent Application No. PCT/EP2018/083641; dated Feb. 25, 2019.
(Continued)

*Primary Examiner* — Ashokkumar B Patel
*Assistant Examiner* — William B Jones
(74) *Attorney, Agent, or Firm* — Barnes & Thornburg, LLP

(57) ABSTRACT

Devices, methods, and a computer program for releasing transportation vehicle components and a vehicle-to-vehicle communication module. The device for releasing a vehicle component of a transportation vehicle includes at least one interface for communication with further vehicle components of the transportation vehicle and a control module for controlling the at least one interface to receive messages from the further vehicle components of the transportation (Continued)

vehicle and to verify the identity of the further vehicle components based on the received messages and the stored identification data of the further vehicle components. The messages on which the verification of the identity of the further vehicle components is based are messages used in regular operation of the vehicle component. The control module also releases the vehicle component in response to the identity of the further transportation vehicle components being consistent with the stored identification data of the further vehicle components.

11 Claims, 6 Drawing Sheets

(51) Int. Cl.
*H04W 12/106* (2021.01)
*H04W 12/71* (2021.01)
*B60R 25/01* (2013.01)
*H04W 12/06* (2021.01)

(52) U.S. Cl.
CPC ......... *H04W 12/106* (2021.01); *H04W 12/71* (2021.01); *B60R 2325/108* (2013.01)

(58) Field of Classification Search
CPC ........... H04W 4/48; H04W 4/40; H04W 4/42; H04W 4/44; B60R 25/01; B60R 2325/108
See application file for complete search history.

(56) References Cited

U.S. PATENT DOCUMENTS

| 10,237,077 | B2 | 3/2019 | Winkelvos et al. |
| 2008/0192929 | A1 | 8/2008 | Knechtel et al. |
| 2009/0047929 | A1 | 2/2009 | Chesnutt et al. |
| 2009/0217031 | A1 | 8/2009 | Kuhls et al. |
| 2009/0288175 | A1 | 11/2009 | Sun et al. |
| 2010/0146174 | A1 | 6/2010 | Djordjevic |
| 2014/0213238 | A1* | 7/2014 | Giraud ................... G07C 5/008 455/418 |
| 2014/0380442 | A1 | 12/2014 | Addepalli et al. |
| 2016/0280371 | A1* | 9/2016 | Canavor ............... H04L 9/3247 |
| 2017/0043731 | A1 | 2/2017 | Kim et al. |
| 2017/0060559 | A1* | 3/2017 | Ye .............................. G06F 8/65 |
| 2017/0093866 | A1 | 3/2017 | Ben-Noon et al. |
| 2020/0120458 | A1* | 4/2020 | Aldana ................... H04W 4/08 |
| 2021/0297199 | A1* | 9/2021 | Miao ..................... H04L 1/1896 |

FOREIGN PATENT DOCUMENTS

| CN | 104554145 | A | 4/2015 |
| CN | 104828013 | A | 8/2015 |
| CN | 106484457 | A | 3/2017 |
| CN | 106484458 | A | 3/2017 |
| CN | 107040368 | A | 8/2017 |
| DE | 102008015195 | A1 | 10/2009 |
| EP | 2881289 | A1 | 6/2015 |
| EP | 3148152 | A1 | 3/2017 |
| EP | 3157281 | A1 | 4/2017 |

OTHER PUBLICATIONS

Office Action for Chinese Patent Application No. 2018800808151; dated Dec. 2, 2021.

Office Action for Chinese Patent Application No. 201880080815.1; dated Jun. 23, 2022.

* cited by examiner

DEVICES, METHODS, AND COMPUTER PROGRAM FOR RELEASING TRANSPORTATION VEHICLE COMPONENTS, AND VEHICLE-TO-VEHICLE COMMUNICATION MODULE

PRIORITY CLAIM

This patent application is a U.S. National Phase of International Patent Application No. PCT/EP2018/083641, filed 5 Dec. 2018, which claims priority to German Patent Application No. 10 2017 222 882.2, filed 15 Dec. 2017, the disclosures of which are incorporated herein by reference in their entireties.

SUMMARY

Illustrative embodiments relate to devices, methods and a computer program for releasing transportation vehicle components as well as to a vehicle-to-vehicle communication module, more precisely, but not exclusively, to releasing a transportation vehicle component based on messages from further transportation vehicle components, which are received during regular operation of the transportation vehicle component.

BRIEF DESCRIPTION OF THE DRAWINGS

Disclosed embodiments are described in more detail below with reference to the drawings, to which exemplary embodiments are generally not altogether limited, however. In the figures.

DETAILED DESCRIPTION

Figure 1A:
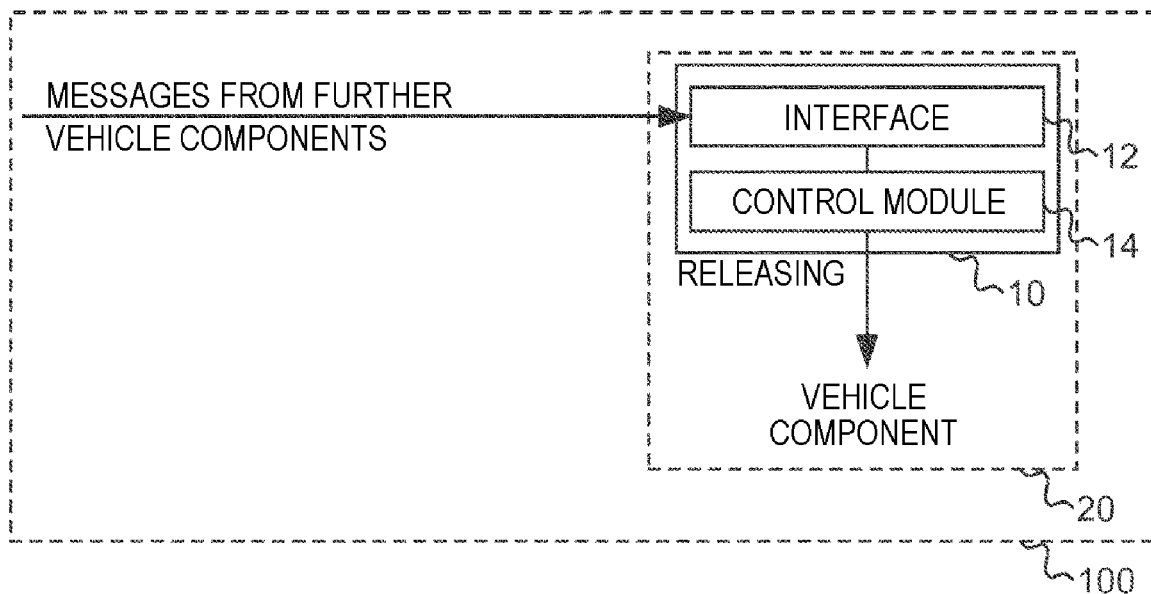
FIG. 1a shows a block diagram of a device for releasing a transportation vehicle component.

Transportation vehicles comprise a variety of different transportation vehicle components—from drive modules such as the gearbox and the engine to communication modules such as a vehicle-to-vehicle communication interface or a mobile phone interface to comfort functions such as seat heaters. To prevent theft of transportation vehicle components and to ensure that transportation vehicle components are used only in the transportation vehicle in which they have been installed by the manufacturer or a specialist workshop, it may be desirable to link the transportation vehicle components to a transportation vehicle and to release them only for use when they are in the correct transportation vehicle.

The European patent application EP 3 148 152 A1 reveals a method for the secure distribution of cryptographic keys for control units of transportation vehicles. The European patent application EP 3 157 281 A1 reveals a method for the protected communication of a transportation vehicle, which is also based on the creation and distribution of key pairs.

There is a need for an improved concept for releasing the use of transportation vehicle components.

This need is taken into account by the devices, methods and the computer program as well as the vehicle-to-vehicle communication module of the independent claims.

Exemplary embodiments provide devices, methods and a computer program for releasing a transportation vehicle component of a transportation vehicle as well as a vehicle-to-vehicle communication module. Releasing refers below to the fact that the transportation vehicle system which is released can be used in a regular mode of the transportation vehicle. Before releasing a transportation vehicle component, for example, a diagnosis can be carried out of the transportation vehicle component or functionality which is necessary for the release of the transportation vehicle component. The full range of functions of the transportation vehicle component, for example, the sending and receiving of vehicle-to-vehicle communication signals in the case of a vehicle-to-vehicle communication module, can only be used after the release of the transportation vehicle component, for example.

In at least some exemplary embodiments, releasing is based on a use of messages between transportation vehicle components that are sent during regular operation of the transportation vehicle or received during regular operation of the transportation vehicle component, for example without a two-way communication between the transportation vehicle component to be activated and further transportation vehicle components from which the messages originate. These messages can be checked as to whether they originate from the further transportation vehicle components that are expected by the transportation vehicle component to be released, for example, by plausibility checking the content of the message, by checking a cryptographically secured message, or by checking a cryptographically generated value. If the transportation vehicle component to be released concludes that the further transportation vehicle components are those installed in the "right" transportation vehicle, then the transportation vehicle component to be released may be released.

Exemplary embodiments create a device for releasing a transportation vehicle component of a transportation vehicle. The device comprises at least one interface, designed for communication with a plurality of further transportation vehicle components of the transportation vehicle. The device also comprises a control module, designed for controlling at least one interface. The control module is designed to receive messages from the plurality of further transportation vehicle components of the transportation vehicle. The control module is designed to verify an identity of the plurality of further transportation vehicle components based on the received messages and based on stored identification data of the plurality of further transportation vehicle components. The messages on which the verification of the identity of the plurality of further transportation vehicle components is based are messages that are used during the regular operation of the transportation vehicle component. In other words, messages on which the verification of the identity of the plurality of further transportation vehicle components is based can be messages that are not exclusively received via the at least one interface for the purpose of verifying the identity of the plurality of further transportation vehicle components. The control module is further designed to release the transportation vehicle component if the identity of the plurality of further transportation vehicle components is consistent with the stored identification data of the plurality of other transportation vehicle components.

The use of messages that are used for regular operation of the transportation vehicle component can replace two-way communication for authentication of the transportation vehicle component and can thus reduce the overhead. In this way, the transportation vehicle component can receive the messages, cache them, determine whether it is in the "right" transportation vehicle using the cached messages, and then start regular operation.

In some exemplary embodiments, the control module is designed to verify the identity of the plurality of further transportation vehicle components based on cryptographically protected messages of the plurality of further transportation vehicle components. This can, for example, enable the verification of the identity of the plurality of further transportation vehicle components by proven cryptographic methods. For example, the cryptographically protected messages can be cryptographically signed. Alternatively or additionally, the cryptographically protected messages can be cryptographically encrypted. By verifying the signature or decrypting the messages based on at least one known key, for example, the identity of the communicating transportation vehicle component can be established or verified. Alternatively, or additionally, the cryptographically protected messages can include a value calculated based on a cryptographic key. For example, all or a grouping of transportation vehicle components of a transportation vehicle can comprise the same key. If they calculate a value from this key and a random number, this value may be verified by another transportation vehicle component with the same key using the random number, thus determining the affiliation of the transportation vehicle components to the same transportation vehicle or to the same group of transportation vehicles. For example, the random number can be provided by a transportation vehicle component ("sink", such as the transportation vehicle component) which requests the calculated value from another transportation vehicle component ("source", such as the other transportation vehicle component) to verify the identity of the other transportation vehicle component (request-response method, also known as the challenge response), or the random number may be provided or derived from an independent third ("trusted") instance.

For example, the identification data of the plurality of further transportation vehicle components may include cryptographic information about the plurality of further transportation vehicle components. The verification of the identity of the plurality of further transportation vehicle components can be successful if the cryptographically protected messages of the plurality of further transportation vehicle components are consistent with the stored cryptographic information. On the basis of these data, the identity of the plurality of further transportation vehicle components can be established or verified. For example, the identification data of the plurality of further transportation vehicle components may include the key of the transportation vehicle or grouping, or for each communication between two transportation vehicle components, a (common) key may be included. A system with private and public keys is also conceivable, wherein the identification data of the plurality of further transportation vehicle components may include the public keys of the plurality of further transportation vehicle components.

In some exemplary embodiments, verification of the identity of the plurality of further transportation vehicle components may be successful if a percentage of cryptographically protected messages of the plurality of further transportation vehicle components received within a predefined time interval that are consistent with the stored cryptographic information is greater than a confidence threshold. For example, the case can be covered in which only some of the transportation vehicle components change—as long as enough further transportation vehicle components can still be identified the transportation vehicle component can start the service.

In some exemplary embodiments, the control module may be designed to verify the identity of the plurality of further transportation vehicle components by a plausibility check of content of the received messages. For example, it may be possible to identify the further transportation vehicle components without having to use cryptographically secured messages.

For example, the plurality of further transportation vehicle components may include a drive engine of the transportation vehicle and/or a gearbox of the transportation vehicle. By including integral components of the transportation vehicle, increased security can be made possible. For example, the plurality of further transportation vehicle components may include at least three (or at least four, at least five) transportation vehicle components of the transportation vehicle. The larger the number of transportation vehicle components that are included, the greater the assurance that the transportation vehicle component is in the "right" transportation vehicle.

For example, at least one transportation vehicle component of the plurality of further transportation vehicle components may be part of a secured grouping of transportation vehicle components of the transportation vehicle. This can also increase security since the release of the transportation vehicle component can be used transitively by the secured grouping.

In at least one exemplary embodiment, the transportation vehicle component can be a vehicle-to-vehicle communication module. The messages received on which the verification of the identity of the plurality of further transportation vehicle components is based may include at least one element of the group of position data of a navigation satellite system for determining the position of the transportation vehicle, steering angle information of the transportation vehicle and speed information of the transportation vehicle. Vehicle-to-vehicle communication of the vehicle-to-vehicle communication module may be based on the release of the vehicle-to-vehicle communication module. A vehicle-to-vehicle communication module can receive a variety of messages from further transportation vehicle components, such as a steering angle, a position, etc., to transmit these via periodic status messages to other transportation vehicles as a broadcast. This variety of messages can be used to release the vehicle-to-vehicle communication module without the need for explicit two-way communication for the release. Exemplary embodiments further provide a vehicle-to-vehicle communication module with the device according to any one of the preceding exemplary embodiments.

Exemplary embodiments further provide a further device for releasing a first transportation vehicle component of a transportation vehicle. The further device comprises at least one interface, which is designed for communication with a second transportation vehicle component of the transportation vehicle. The second transportation vehicle component is released by a device according to any one of the previous exemplary embodiments. The further device comprises a control module, which is designed to control the at least one interface. The control module is designed to receive at least one message from the second transportation vehicle component via the at least one interface. The control module is further designed to authenticate the second transportation vehicle component based on the at least one message received from the second transportation vehicle component. The control module is further designed to release the first transportation vehicle component, if the at least one received message implies that the second transportation vehicle component has been released by the device according to any one of the previous exemplary embodiments and if the authentication of the second transportation vehicle component is successful.

The use of an already released transportation vehicle component, which has been released by the device as described earlier, for deciding whether the transportation vehicle component can be released, allows the use of the security functions that led to the release of that transportation vehicle component without the transportation vehicle component itself having to implement these security functions.

Exemplary embodiments also provide a method for releasing a transportation vehicle component of a transportation vehicle. The method includes receiving messages of a plurality of further transportation vehicle components of the transportation vehicle. The method also includes verifying an identity of the plurality of further transportation vehicle components based on the received messages and based on stored identification data of the plurality of further transportation vehicle components. The messages on which the verification of the identity of the plurality of further transportation vehicle components is based are messages that are used for the regular operation of the transportation vehicle component. The method also includes releasing the transportation vehicle component if the identity of the plurality of further transportation vehicle components is consistent with the stored identification data of the plurality of further transportation vehicle components.

The use of messages that are used for regular operation of the transportation vehicle component can replace two-way communication for authenticating the transportation vehicle component, thus reducing the overhead. In this way, the transportation vehicle component can receive the messages, cache them, and use the cached messages to determine whether it is in the "right" transportation vehicle and then start regular operation.

Exemplary embodiments also provide a method for releasing a first transportation vehicle component and a second transportation vehicle component of a transportation vehicle. The method includes receiving, by the second transportation vehicle component of the transportation vehicle, messages of a plurality of further transportation vehicle components of the transportation vehicle. The method also includes verification by the second transportation vehicle component of an identity of the plurality of further transportation vehicle components based on the received messages and based on stored identification data of the plurality of further transportation vehicle components. The messages on which the verification of the identity of the plurality of further transportation vehicle components is based are messages that are used for the regular operation of the second transportation vehicle component. The procedure also includes releasing the second transportation vehicle component if the identity of the plurality of further transportation vehicle components is consistent with the stored identification data of the plurality of further transportation vehicle components. The method further includes the first transportation vehicle component receiving at least one message from the second transportation vehicle component. The method also involves the first transportation vehicle component authenticating the second transportation vehicle component based on the at least one message received from the second transportation vehicle component. The method also includes releasing the first transportation vehicle component if the at least one received message implies that the second transportation vehicle component has been released and if the authentication of the second transportation vehicle component is successful.

Exemplary embodiments also provide a program with a program code for performing at least one of the methods when the program code is executed on a computer, a processor, a control module, or a programmable hardware component.

Various exemplary embodiments are now described further with reference to the enclosed drawings, in which some exemplary embodiments are represented. In the figures, the thickness dimensions of lines, layers and/or regions can be exaggerated for the sake of clarity.

In the following description of the attached figures, which show only a few exemplary embodiments, identical reference characters may denote identical or comparable components. Furthermore, summary reference characters can be used for components and objects that occur multiple times in an exemplary embodiment or in a drawing but that are jointly described with respect to one or more features. Components or objects described with the same or summary reference characters may be the same with respect to individual, multiple or all characteristics, such as their dimensions, but may also be implemented differently, unless explicitly or implicitly stated otherwise in the description.

Although exemplary embodiments can be modified and amended in various ways, exemplary embodiments in the figures are presented as examples and are described in detail herein. However, it should be made quite clear that it is not intended to limit exemplary embodiments to the respective disclosed forms, but that exemplary embodiments should rather cover all functional and/or structural modifications, equivalents and alternatives which lie in the scope of the disclosed embodiments. The same reference characters denote identical or similar elements in the entire description of the figures.

Note that an element that is referred to as "connected" or "coupled" to another element, may be directly connected or coupled to the other element, or that there may be intermediate elements. On the other hand, if an element is referred to as "directly connected" or "directly coupled" to another element, there are no intermediate elements. Other terms used to describe the relationship between elements should be interpreted in a similar way (e.g., "between" versus "directly in between," "adjacent" versus "directly adjacent" etc.).

The terminology used herein is used for the purpose of describing specific exemplary embodiments only and is not intended to limit the exemplary embodiments. As used herein, the singulars "a," "an" and "the" shall also include the plural forms, as long as the context does not clearly indicate otherwise. It should also be clarified that the expressions, such as "contains", "containing", "has", "comprises", "comprising", and/or "having" as used herein, specify the presence of mentioned features, integers, workflows, elements and/or components, but do not exclude the presence or addition of one or more features, integers, workflows, elements, components and/or groups thereof.

As long as not defined otherwise, all the terms used herein (including technical and scientific terms) have the same meaning as that given to them by an average person skilled in the field to which the exemplary embodiments belong. It should also be clarified that expressions, such as those defined in generally used dictionaries, must be interpreted as having the meaning consistent with their meaning in the context of the relevant technique and are not to be interpreted in an idealized or excessively formal sense, as long as this is not expressly defined herein.

At least some exemplary embodiments provide transitively and quantitatively scalable grouping authentications in a transportation vehicle (or more generally in a distributed system).

In at least one exemplary embodiment by way of example, a Car2Car (vehicle-to-vehicle) control unit (which can be used for a digital roof antenna, for example) may not be used outside the transportation vehicle to send C2C messages. Permission to transmit, for example, may require various properties of the transportation vehicle condition, which when combined can allow a qualitative and quantitative increase in confidence in the property. For example, some other functions that transmit outside the transportation vehicle may require that (only) the real transportation vehicle transmits. This concept can be transferred, for example, to other control units in the transportation vehicle that are not intended to be usable outside the transportation vehicle, i.e., the concept is not limited to Car2Car control units.

In some systems, it can be determined whether a control unit is in a particular transportation vehicle by checking the transportation vehicle identification number (VIN) via the transportation vehicle bus. Alternatively or additionally, the corresponding control unit can be connected to the immobilizer network and/or to the component protection (protection of components against theft). These connections can be functions that are directly provided only for determining the affiliation of the control unit to the transportation vehicle, i.e., additional function(s). The connections can be used with a separate function to determine whether the transportation vehicle is in an authenticated grouping (usually a master/slave system). It can be noted that checking the VIN may not be technically sufficient in some cases, as an attacker could possibly manipulate or "spoof" the VIN. In the case of the connection of the control unit into the immobilizer network, for example, there may be a risk that the transportation vehicle may be immobilized in the event of problems with the control unit, wherein the control unit has nothing to do with the release of the immobilizer from an anti-theft point of view. In addition, an additional function can be integrated during the connection without functional benefit for the control unit, thus creating overhead (additional administrative burden). In addition, scaling can be difficult, since these connections are mostly master/slave systems, i.e., the control unit can only detect the presence of another control unit, for example.

FIG. 1a shows a block diagram of a device 10 for releasing a transportation vehicle component 20 of a transportation vehicle 100. The device 10 comprises at least one interface 12 that is designed for communication with a plurality of further transportation vehicle components of the transportation vehicle 100. The device 10 further comprises a control module 14 designed for controlling the at least one interface 12. The control module 14 is further designed for receiving messages of the plurality of further transportation vehicle components of the transportation vehicle. The control module 14 is further designed for verifying an identity of the plurality of further transportation vehicle components based on the received messages and based on stored identification data of the plurality of further transportation vehicle components. The messages on which the verification of the identity of the plurality of further transportation vehicle components is based are messages that are used for the regular operation of transportation vehicle component 20. In other words, the messages on which the verification of the identity of the plurality of further transportation vehicle components is based may be messages that are not received via at least one interface 12 solely for the purpose of verifying the identity of the plurality of further transportation vehicle components. The control module 14 is further designed to release the transportation vehicle component 20 if the identity of the plurality of further transportation vehicle components is consistent with the stored identification data for the plurality of further transportation vehicle components.

FIG. 1a further shows the transportation vehicle component 20 including the device 10, and the transportation vehicle 100 including the transportation vehicle component 20 with the device 10. The transportation vehicle may also comprise the plurality of further transportation vehicle components. The at least one interface 12 is coupled to the control module 14.

FIG. 1a shows a corresponding method for releasing the transportation vehicle component 20 of the transportation vehicle 100. The method includes receiving 110 messages from a plurality of further transportation vehicle components of the transportation vehicle 100. The method also includes verifying 120 an identity of the plurality of further transportation vehicle components based on the received messages and based on stored identification data of the plurality of further transportation vehicle components. The messages on which the verification of the identity of the plurality of further transportation vehicle components is based are messages that are used for the regular operation of transportation vehicle component 20. The method further includes releasing 130 the transportation vehicle component 20 if the identity of the plurality of further transportation vehicle components is consistent with the stored identification data of the plurality of further transportation vehicle components. The following description refers to both the device 10 of FIG. 1a and to the method of FIG. 1b.

The release of transportation vehicle components in at least some exemplary embodiments refers to the release or activation of a regular operation of the transportation vehicle component and/or the release of a use of the transportation vehicle component. Before the release of a transportation vehicle component, for example, a diagnosis can be carried out of the transportation vehicle component or the functionality which is necessary for the release of the transportation vehicle component. By releasing the transportation vehicle component, the full range of functions of the transportation vehicle component can be enabled. For example, the release of the transportation vehicle component can activate the use of the transportation vehicle component in regular operation. For example, a transportation vehicle component (such as the transportation vehicle component 20 and/or the plurality of further transportation vehicle components) may be released if a check shows that the transportation vehicle component is located in the transportation vehicle for which it is intended.

The transportation vehicle component and/or the plurality of further transportation vehicle components may, for example, be components of the transportation vehicle that are designed to communicate with further transportation vehicle components within the transportation vehicle, such as control units, actuators, sensors, and control modules of the transportation vehicle. In at least one exemplary embodiment by way of example, the transportation vehicle component 20 can be a vehicle-to-vehicle communication module, for example. For example, the transportation vehicle component 20 and/or the plurality of further transportation vehicle components may be designed to communicate (with each other) via a transportation vehicle bus, such as a Controller Area Network bus (CAN bus) or a Local Interconnect Network (LIN).

In at least some exemplary embodiments, the transportation vehicle 100 may, for example, correspond to a land transportation vehicle, a watercraft, an aircraft, a rail transportation vehicle, a road transportation vehicle, a car, an all-terrain transportation vehicle, a transportation vehicle, or a truck.

The at least one interface 12 may correspond, for example, to one or more inputs and/or one or more outputs for receiving and/or transmitting information, for example, in digital bit values, based on a code, within a module, between modules, or between modules of different entities. For example, the at least one interface 12 may be designed to communicate via the Controller Area Network bus or the Local Interconnect Network with the plurality of further transportation vehicle components of the.

In at least some exemplary embodiments, communication with the plurality of further transportation vehicle components can be a one-way communication. For example, the communication may include (only) messages which are transmitted by the plurality of further transportation vehicle components and received from the at least one interface. For example, the at least one interface 12 may be designed to receive or listen for messages transmitted by the plurality of further transportation vehicle components via the Controller Area Network bus or via the Local Interconnect Network, without these messages being explicitly addressed to the transportation vehicle component 20 or the device 10. In at least some exemplary embodiments, the at least one interface 12 may be designed to receive messages from the plurality of further transportation vehicle components.

Alternatively, communication with the plurality of further transportation vehicle components can be a two-way communication. For example, the at least one interface 12 may be designed to transmit messages to the plurality of further transportation vehicle components and to receive messages from the plurality of further transportation vehicle components. For example, the control module 14 may be designed to perform a challenge-response procedure by transmitting a message to the plurality of further transportation vehicle components and receiving the response from the plurality of further transportation vehicle components. The response may, for example, be included in the messages of the plurality of further transportation vehicle components, which are used for the regular operation of the transportation vehicle component.

In at least some exemplary embodiments, the plurality of further transportation vehicle components include transportation vehicle components, the messages of which are used or required for the regular operation of the transportation vehicle component 20. For example, the plurality of further transportation vehicle components may include (only) sensors with messages that are used or required for the regular operation of transportation vehicle component 20. The plurality of further transportation vehicle components may be, for example, transportation vehicle components that are particularly difficult to remove from the transportation vehicle. For example, the plurality of further transportation vehicle components may include a drive engine of the transportation vehicle 100 and/or a gearbox of the transportation vehicle 100. Alternatively or additionally, the plurality of further transportation vehicle components may comprise (only) transportation vehicle components, which first transmit messages to the transportation vehicle component 20/the device 10, after they are in turn released, for example, based on a secured grouping of transportation vehicle components. In some exemplary embodiments, the plurality of further transportation vehicle components may comprise at least three (or at least four, at least five) transportation vehicle components of the transportation vehicle 100. In at least some exemplary embodiments, the control module 14 may be designed to release the transportation vehicle component 20 if the identity of all or a sufficient number of transportation vehicle components of the plurality of further transportation vehicle components has been successfully verified.

In exemplary embodiments, the control module 14 can correspond to any controller or processor or a programmable hardware component. For example, the control module 14 can also be implemented as software which is programmed for a suitable hardware component. In this respect, the control module 14 can be implemented as programmable hardware with appropriately adapted software. In this case, any processor can be used, such as digital signal processors (DSPs). Exemplary embodiments are not limited to a specific type of processor.

Any processor or even multiple processors are conceivable for the implementation of the control module 14.

In at least some exemplary embodiments, receiving messages from the plurality of further transportation vehicle components involves receiving messages via a bus system or a peer-to-peer network system. The messages may be addressed, for example, to the transportation vehicle component 20 or to the device 10. Alternatively, the control module 14 may be designed to listen on the transportation vehicle bus via the at least one interface 12 and to receive the messages even if they do not specify a dedicated receiver or specify another receiver.

In at least some exemplary embodiments, the identity of a transportation vehicle component is what distinguishes or identifies the transportation vehicle component compared to further transportation vehicle components, such as a serial number, an identification mark or a (cryptographic) key. The identity of a transportation vehicle component can be used to distinguish it from another transportation vehicle component. For example, the identity of a transportation vehicle component can be unique, i.e., each transportation vehicle component can have its own identity. For example, transportation vehicle components of the same transportation vehicle component type that can be used for the same transportation vehicle model may have different identities. In some exemplary embodiments, the identity of a transportation vehicle component can be determined during the production of the transportation vehicle component. Alternatively or additionally, the identity of the transportation vehicle components can be determined or changed after production, for example, by assigning a serial number, an identification mark or a (cryptographic) key. If a transportation vehicle component of the plurality of further transportation vehicle components is replaced, the added transportation vehicle component may have a different identity than the transportation vehicle component that has been removed. When a transportation vehicle component is replaced, either the added transportation vehicle component can be added to the stored identifier data, or the identity of the transportation vehicle component that has been removed can be transferred to the added transportation vehicle component. In some exemplary embodiments, (all) transportation vehicle components of the plurality of further transportation vehicle components may have the same identity. In this case, the identity of a transportation vehicle component can indicate an affiliation of the transportation vehicle component to a (secured) grouping of transportation vehicle components or to a transportation vehicle (grouping identity).

Verifying an identity of a transportation vehicle component of the plurality of further transportation vehicle components may determine, for example, whether the identity of the transportation vehicle component of the plurality of further transportation vehicle components is included in the stored identification data in the control module 14. For example, the stored identification data may include serial numbers, identification marks, or (cryptographic) keys for the plurality of further transportation vehicle components. For example, the stored identification data may comprise (dedicated) identification data for each transportation vehicle component of the plurality of further transportation vehicle components. Alternatively, the stored identification data for (all) transportation vehicle components of the plurality of further transportation vehicle components may comprise the same identification data, for example, if the identity of a transportation vehicle component indicates the affiliation of the transportation vehicle component to a grouping of transportation vehicle components or to a transportation vehicle. The device 10 may further comprise a memory that is designed for storing the stored identification data. The memory can be coupled to the control module 14. For example, the control module 14 may be designed to obtain the identification data during installation of the device, the transportation vehicle component or the further transportation vehicle component. In the event of replacement of the device, the transportation vehicle component or the other transportation vehicle component, the identification data can be adapted or replaced, for example.

In at least some exemplary embodiments, the control module 14 may be designed to check or to ensure that it is receiving messages from those transportation vehicle components from which it expects or believes to be receiving messages by verifying the identity of the plurality of further transportation vehicle components. Verifying the identity of a transportation vehicle component of the plurality of further transportation vehicle components may include a check that a message received from the transportation vehicle component of the plurality of further transportation vehicle components indicates that the message originates from the transportation vehicle component known to the control module 14 through the stored identification data. For example, the verification of the identity of a transportation vehicle component may be successful if the identity of the transportation vehicle component is consistent with the stored identification data. In some exemplary embodiments, the verification of the identity of the plurality of further transportation vehicle components may be successful if the verification of all transportation vehicle components of the plurality of further transportation vehicle components is successful. Alternatively, the verification of the identity of the plurality of further transportation vehicle components may be successful, if the verification of a sufficiently large proportion of transportation vehicle components of the plurality of further transportation vehicle components is successful. For example, transportation vehicle components of the plurality of further transportation vehicle components can be ignored, which have not transmitted a message to the device 10/the transportation vehicle component 20 within a predefined time interval before the release of the transportation vehicle component 20. In some exemplary embodiments, verifying the identity of the plurality of further transportation vehicle components may include a check of whether messages from all transportation vehicle components of the plurality of further transportation vehicle components have been received. For example, verifying the identity may succeed if verification is successful for those transportation vehicle components from which messages have been received and the control module has received messages from a sufficiently large number of transportation vehicle components. In some exemplary embodiments, the control module 14 may be designed to release the transportation vehicle component 20 if the verification for the identity for all transportation vehicle components of the plurality of other transportation vehicle components is successful. Alternatively, the control module 14 may be designed to release the transportation vehicle component 20 if the verification of a sufficiently large proportion of transportation vehicle components of the plurality of further transportation vehicle components is successful.

The control module 14 may be designed, for example, to derive the identity of the plurality of further transportation vehicle components from the received messages. The control module 14 may also be designed to compare the derived identity of the plurality of further transportation vehicle components with the stored identification data. If the derived identification data is consistent with the stored identification data, the verification of the identity of the plurality of further transportation vehicle components can be successful. A (derived) identity can be consistent with the stored identification data if the stored identification data results in a match with the identity, i.e., based on a comparison of character strings, for example, or by calculating a value from the identity and/or the stored identification data. For example, a (derived) identity may be consistent with the stored identification data if the identity is included in the stored identification data, for example, as a serial number, an identification mark or a (cryptographic) signature. Alternatively or additionally, a (derived) identity may be consistent with the stored identification data, for example, if the (derived) identity and the stored identification data can be linked by a mathematical function that shows whether the identity and the stored identification data are consistent.

For example, the control module 14 may be designed to verify the identity of the plurality of further transportation vehicle components based on cryptographically protected messages of the plurality of further transportation vehicle components. For example, the messages received from the plurality of further transportation vehicle components can be cryptographically protected messages and/or can include a value calculated based on a cryptographic key.

In some exemplary embodiments, the control module 14 and the plurality of further transportation vehicle components may include a common secret, for example, a common cryptographic key, which may be separate for each transportation vehicle component of the plurality of further transportation vehicle components or may be a common secret for all transportation vehicle components of the plurality of further transportation vehicle components. The common secret can be set, for example, during the production of the transportation vehicle or when a transportation vehicle component is installed by a specialist workshop. The control module 14 may be designed to receive a value that is calculated by the plurality of further transportation vehicle components based on a random number or a random string and based on the common secret (for example, separately for each transportation vehicle component) and that is contained in the messages from the plurality of further transportation vehicle components. Each transportation vehicle component of the plurality of further transportation vehicle components can calculate the value separately, for example, and the control module 14 may be designed to receive the values separately from the transportation vehicle components of the plurality of further transportation vehicle components. In some exemplary embodiments, the control module 14 may be designed to receive the random number or random string as part of the messages from the plurality of further transportation vehicle components. For example, the random number can be provided by a third ("trusted") instance for the further transportation vehicle components and/or transportation vehicle component 20. Alternatively, the control module 14 may be designed to provide the random number or random string to the plurality of further transportation vehicle components and in response to receive the calculated values in the messages used for regular operation of the transportation vehicle component 20. Alternatively or additionally, the control module 14 may be designed to derive the random number or random string from a seed value. For example, the seed value can be calculated based on a time value (which can be provided by the trusted third instance, for example), and specifies the starting point for calculating the random number or the random value.

For example, each transportation vehicle component of the plurality of further transportation vehicle components can calculate its own random number or its own random string and can provide it to the device 10. The control module 14 may be designed to calculate the value (or values) itself based on the random number or random string and based on the common secret and to compare the self-calculated value with the values received from the plurality of further transportation vehicle components to verify the identity of the plurality of further transportation vehicle components.

Alternatively or additionally, the cryptographically protected messages can be cryptographically signed. Alternatively or additionally, the cryptographically protected messages can be cryptographically encrypted. For example, the control module 14 may be designed to check a signature (or signatures) of the received messages and/or to decrypt the received messages to verify the identity of the plurality of further transportation vehicle components. If the signature (or signatures) or the encryption of the received messages correspond(s) to the stored identification data, the verification of the identity of the plurality of further transportation vehicle components can be successful. The stored identification data of the plurality of further transportation vehicle components may include, for example, cryptographic information about the plurality of further transportation vehicle components, such as information about at least one key used by the plurality of further transportation vehicle components. Verification of the identity of the plurality of further transportation vehicle components may be successful, for example, if the cryptographically protected messages (of all transportation vehicle components) of the plurality of further transportation vehicle components are consistent with the stored cryptographic information. For example, verification of the identity of the plurality of further transportation vehicle components may be successful if a proportion of cryptographically protected messages of the plurality of further transportation vehicle components received within a predefined time interval that are consistent with the stored cryptographic information is higher than a confidence threshold. For example, the control module 14 may be designed to compare a signature or encryption with the cryptographic information to determine whether the signature or encryption is compatible with the cryptographic information. If it is compatible, the control module 14 can successfully verify the identity of one (or more/all) transportation vehicle components, for example. Alternatively or additionally, the control module 14 may be designed to calculate a value based on the cryptographic information, and to compare the value with at least one value received from the plurality of further transportation vehicle components. If the values match, the control module 14 can successfully verify one (or all) transportation vehicle component(s) of the plurality of further transportation vehicle components, for example.

In some exemplary embodiments, the control module 14 may be designed to verify the identity of the plurality of further transportation vehicle components by a plausibility check of the contents of the received messages. For example, the control module 14 may be designed to check whether the received messages have content that is within an expected framework, or whether the received messages have a content that differs only within a tolerance range from the content of messages previously received from the plurality of other transportation vehicle components, for example, based on numbering of the messages. The control module 14 may be designed to ensure that all the data resulting from the messages are also present and plausible. Plausibility checking can be implemented in such a way that it cannot be circumvented or falsified with little effort.

In at least some exemplary embodiments, messages used for the regular operation of the transportation vehicle component 20 may be messages that are used by the transportation vehicle component 20 after an initialization of the transportation vehicle component. The regular operation of the transportation vehicle component 20 may be a state in which the transportation vehicle component is fully functional, for example. In at least some exemplary embodiments, releasing the transportation vehicle component involves activating or starting a regular operation of the transportation vehicle component. For example, the control module 14 may be designed to change a state of the transportation vehicle component 20 to "regular operation". The transportation vehicle component 20 can take up the regular operation, for example, after an initialization of the transportation vehicle component, which may include the release of the transportation vehicle component, has taken place. For example, the messages used for the regular operation of the transportation vehicle component 20 may include sensor data of the plurality of further transportation vehicle components that are processed or forwarded by the transportation vehicle component 20. For example, the messages on which the release of the transportation vehicle component 20 is based can be messages that are used for the regular operation of the plurality of further transportation vehicle components and/or that are sent by them (for example, periodically). For example, the messages on which the verification of the identity of the plurality of further transportation vehicle components is based may be messages that are not received via at least one interface 12 solely for the purpose of verifying the identity of the transportation vehicle components. For example, the messages on which the verification of the identity of the plurality of further transportation vehicle components is based can be passively transmitted by the device 10, i.e., can be received by the plurality of further transportation vehicle components without prompting the device 10 to transmit the messages. For example, the messages on which the verification of the identity of the plurality of further transportation vehicle components is based may include useful data for the regular operation of the transportation vehicle component. The messages on which the release of the transportation vehicle component 20 is based may be messages which are not sent by the plurality of further transportation vehicle components solely for the purpose of releasing the transportation vehicle component.

In some exemplary embodiments, at least one transportation vehicle component of the plurality of further transportation vehicle components may be part of a secured grouping of transportation vehicle components of the transportation vehicle 100. In at least some exemplary embodiments, the secured grouping of transportation vehicle components may comprise a plurality of transportation vehicle components, which are interlinked in such a way that compromising a transportation vehicle component of the plurality of transportation vehicle components prevents the release of the further transportation vehicle components of the plurality of transportation vehicle components of the secured grouping. For example, the transportation vehicle components of the secured grouping can mutually ensure that no transportation vehicle component of the secured grouping has been compromised or is compromised. In some exemplary embodiments, the plurality of further transportation vehicle components can form the secured grouping. For example, the secured grouping can include all transportation vehicle components of the plurality of further transportation vehicle components. The control module 14 may be designed, for example, to release the transportation vehicle component 20 if the messages imply that the plurality of further transportation vehicle components are released. For example, receiving messages from the plurality of further transportation vehicle components (which may be part of the secured grouping) can imply that the plurality of further transportation vehicle components are released.

In at least one exemplary embodiment, the transportation vehicle component 20 can be a vehicle-to-vehicle communication module. The received messages, on which the verification of the identity of the plurality of further transportation vehicle components is based, may include at least one element of the group of position data of a navigation satellite system for the position determination of the transportation vehicle 100, steering angle information of the transportation vehicle 100 and speed information of the transportation vehicle 100. A vehicle-to-vehicle communication of the vehicle-to-vehicle communication module can be based on the release of the vehicle-to-vehicle communication module. FIG. 1a further shows the vehicle-to-vehicle communication module 20 with the device 10 according to at least one of the preceding exemplary embodiments. For example, the vehicle-to-vehicle communication module may be designed to communicate via vehicle-to-vehicle communication only when vehicle-to-vehicle communication is released. If, for example, a positioning module belongs to the plurality of further transportation vehicle components, so the at least one message can use position data of the positioning module—the navigation satellite system sends data, so as a result the release of the navigation satellite system by the at least one message can trigger the release of the vehicle-to-vehicle communication module (together with messages of the further transportation vehicle components of the plurality of further transportation vehicle components).

Figure 1B:
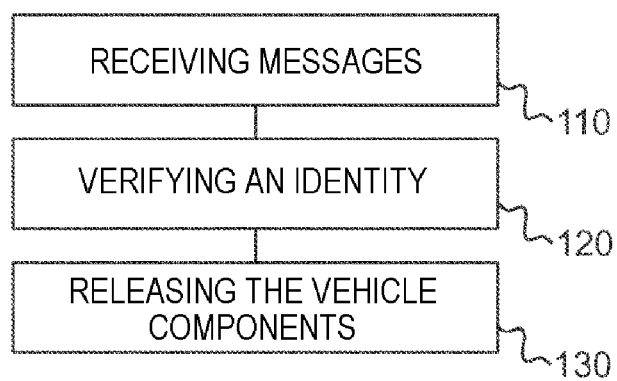
FIG. 1b shows a flowchart of a method for releasing a transportation vehicle component.
Figure 2A:
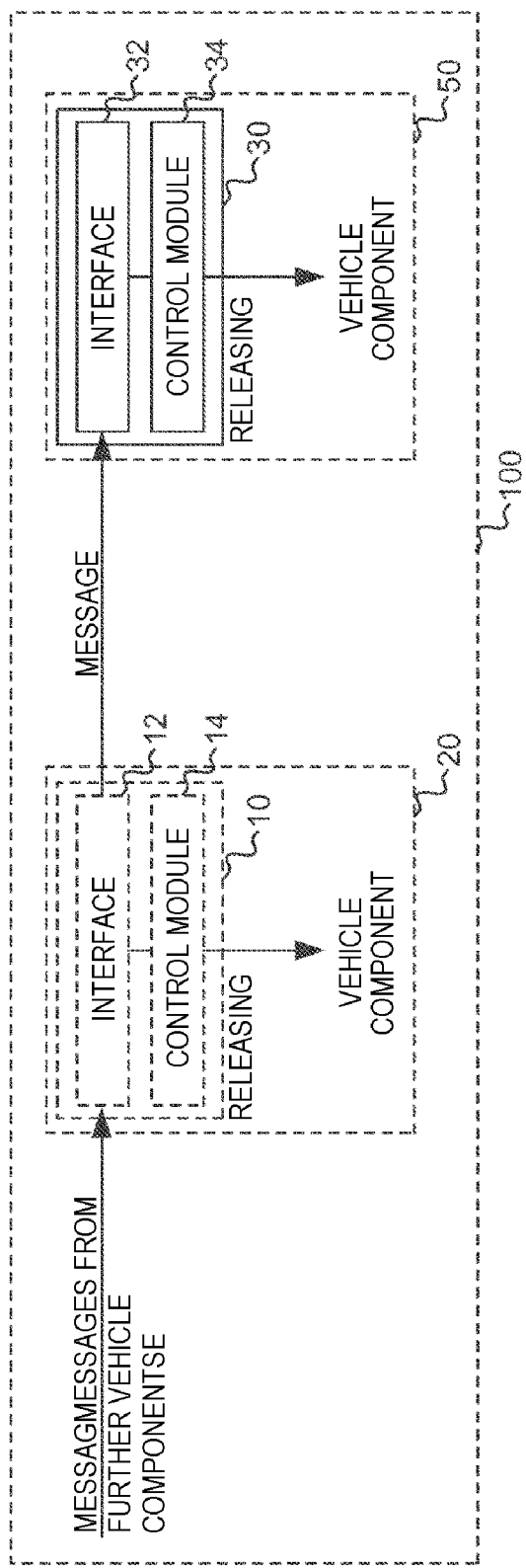
FIG. 2a shows a block diagram of further device for releasing a transportation vehicle component.

FIG. 2a shows a block diagram of a device 30 for releasing a first transportation vehicle component 50 of a transportation vehicle 100. The device 30 comprises at least one interface 32, designed for communication with a second transportation vehicle component 20 of the transportation vehicle 100. The second transportation vehicle component 20 is released by a device 10 as introduced in connection with FIG. 1. For example, the second transportation vehicle component 20 can correspond to the transportation vehicle component 20 of FIGS. 1a and/or 1b. The first transportation vehicle component can be implemented in a similar way to the transportation vehicle component 20 or to a transportation vehicle component of the plurality of further transportation vehicle components of FIG. 1a. The device 30 further comprises a control module 34, designed for controlling the at least one interface 32. The at least one interface 32 can be implemented in a similar way to the interface 12 of FIG. 1a, for example. The control module 34 can be implemented in a similar way to the control module 14 of FIG. 1a. The control module 34 is further designed for receiving at least one message from the second transportation vehicle component 20 via the at least one interface 32. The control module 34 is further designed to authenticate the second transportation vehicle component 20 based on the at least one message received from the second transportation vehicle component 20. The control module 34 is further designed to release the first transportation vehicle component 50 if the at least one received message implies that the second transportation vehicle component 20 was released by the device 10 and if the authentication of the second transportation vehicle component is successful.

Figure 2B:
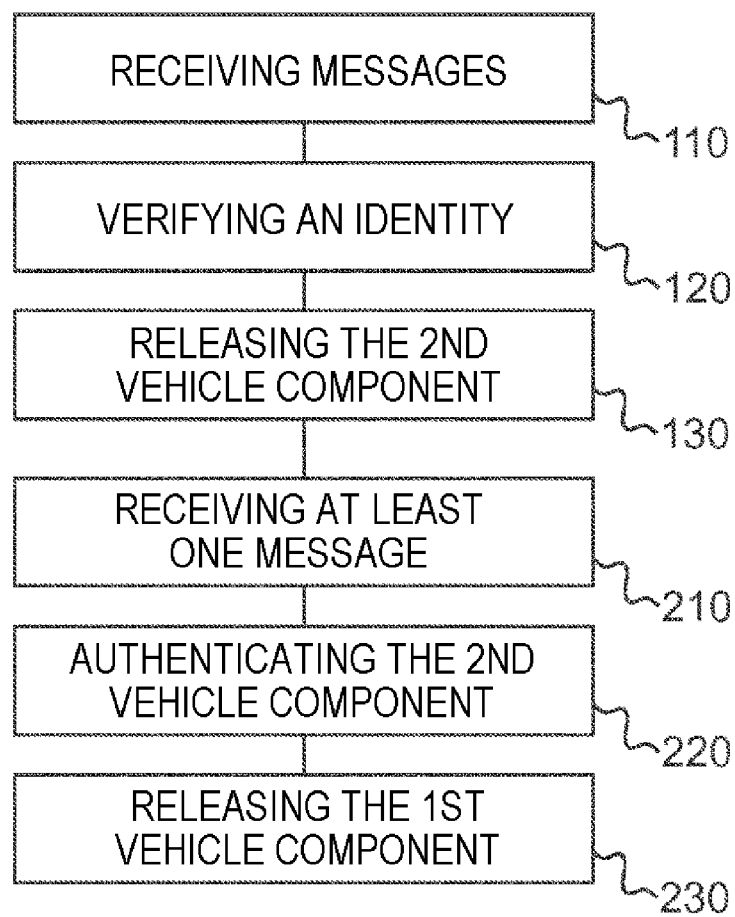
FIG. 2b shows a flowchart of a further method for releasing a transportation vehicle component.

FIG. 2b shows a flowchart of a corresponding method for releasing the first transportation vehicle component 50 and the second transportation vehicle component 20 of the transportation vehicle 100. The method includes receiving 110 messages from the plurality of further transportation vehicle components of the transportation vehicle 100 by the second transportation vehicle component 20 of the transportation vehicle 100. The method also includes verifying 120 the identity of the plurality of further transportation vehicle components by the second transportation vehicle component 20 based on the received messages and based on stored identification data of the plurality of further transportation vehicle components. The messages on which the verification of the identity of the plurality of further transportation vehicle components is based are messages that are used for the regular operation of the second transportation vehicle component 20. The method also includes releasing 130 the second transportation vehicle component 20 (by the second transportation vehicle component 20) if the identity of the plurality of the further transportation vehicle components is consistent with the stored identification data of the plurality of further transportation vehicle components. The method further includes receiving 210 at least one message of the second transportation vehicle component 20 by the first transportation vehicle component 50. The method also includes authenticating 220 the second transportation vehicle component 20 by the first transportation vehicle component 50 based on the at least one message received from the second transportation vehicle component. The method also includes releasing 230 the first transportation vehicle component 50 (by the first transportation vehicle component 50), if the at least one received message implies that the second transportation vehicle component 20 has been released and if the authentication of the second transportation vehicle component 20 is successful. The following description refers to both the device 30 of FIG. 2a and to the method of FIG. 2b.

In at least some exemplary embodiments, communication with the second transportation vehicle component 20 may be a two-way communication. For example, the at least one interface 32 may be designed to transmit messages to the second transportation vehicle component and to receive messages from the second transportation vehicle component. For example, the control module 34 may be designed to perform a challenge-response procedure by transmitting a message to the second transportation vehicle component and receiving the response from the second transportation vehicle component.

Alternatively, the communication with the second transportation vehicle component 20 can be a one-sided communication. For example, the communication may include (only) messages that are transmitted by the second transportation vehicle component and which are received by the at least one interface. For example, the at least one interface 32 may be designed to receive or listen for messages transmitted from the second transportation vehicle component via the Controller Area Network bus or via the Local Interconnect Network without these messages being explicitly addressed to the first transportation vehicle component 50 or the device 30. In at least some exemplary embodiments, the at least one interface 32 may be designed to receive messages from the second transportation vehicle component.

In at least some exemplary embodiments, receiving the at least one message from the second transportation vehicle component involves receiving the at least one message via a bus system or a peer-to-peer network system. The at least one message may be addressed to the first transportation vehicle component 50 or the device 30, for example. Alternatively, the control module 34 may be designed to listen via at least one interface 32 on the transportation vehicle bus and to receive at least one message, even if this does not specify a dedicated receiver or specifies another receiver. For example, the at least one message on which the release of the first transportation vehicle component 50 is based may be at least one message which is used for the regular operation of the first transportation vehicle component 50 or for the regular operation of the second transportation vehicle component 20. In other words, the at least one message on which the release of the first transportation vehicle component 50 is based may be at least one message which is not received via the at least one interface 32 exclusively for the purpose of releasing the transportation vehicle component 50 or which is not sent by the second transportation vehicle component 20 exclusively for the purpose of releasing the first transportation vehicle component. In some exemplary embodiments, the control module 34 may be designed to receive at least one message in response to a request/challenge to the second communication module, for example, as part of a challenge-response authentication method.

In at least some exemplary embodiments, a successful authentication of the second transportation vehicle component 20 by the control module 34 means or implies that the control module 34 trusts the second transportation vehicle component 20. Successful authentication 20 may mean or imply that the control module 34 is sufficiently certain that the second transportation vehicle component 20 is released by the device 10. By authenticating the second transportation vehicle component 20, the control module 34 can check whether the at least one message it receives is a message of the second transportation vehicle component 20, which is released by the device 10. The authentication of the second transportation vehicle component 20 may include, for example, the determination and/or identification of an identity of the second transportation vehicle component 20 and/or a check of the release of the second transportation vehicle component by the device 10.

The control module 34 may, for example, be designed to conclude the authenticity of the second transportation vehicle component 20 based on the at least one message received from the second transportation vehicle component 20. In some exemplary embodiments, the control module 34 may be designed to determine the authenticity of the second transportation vehicle component based on only a (single) received message. In some examples, the control module 34 may be designed not to transmit messages to the second transportation vehicle component before receiving at least one message on which the authentication of the second transportation vehicle component is based. Alternatively, the at least one message may be a response to a request or challenge that the control module 34 transmits to the second transportation vehicle component 20.

For example, the control module 34 may be designed to authenticate the second transportation vehicle component 20 based on a challenge-response authentication method. For example, the control module 34 may be designed to send a request or challenge (the challenge-response authentication method) to the second transportation vehicle component, and the at least one message of the second transportation vehicle component 20 may be the response to the request or challenge. In some exemplary embodiments, the control module 34 and the second transportation vehicle component 20 may comprise a common secret, for example, a common cryptographic key. The control module 34 may be designed to challenge the second transportation vehicle component to calculate a value based on a random number or a random string and based on the common secret. The control module 34 may be designed to transmit the random number or the random string of the second transportation vehicle component 20, for example, together with the challenge. The control module 34 may be designed to receive the value calculated by the second transportation vehicle component 20 included in the at least one message from the second transportation vehicle component. The control module 34 may be designed to calculate the value based on the random number or random string and based on the common secret itself and to compare the self-calculated value with the value calculated by the second transportation vehicle component 20 to authenticate the second transportation vehicle component. For example, the control module 34 may comprise a common secret for each additional transportation vehicle component to be authenticated. Alternatively, the common secret can be the same for all transportation vehicle components of a transportation vehicle. The common secret can be set, for example, when the transportation vehicle is manufactured or when a transportation vehicle component is installed by a specialist workshop.

Alternatively or additionally, the cryptographically protected messages can include a value calculated based on a cryptographic key (which can be implemented similarly to a challenge-response authentication method). In at least some exemplary embodiments, the control module 34 and the second transportation vehicle component 20 comprise a common secret, such as a cryptographic key. In some exemplary embodiments, all or a grouping of transportation vehicle components of a transportation vehicle may comprise the same key. The control module 34 may be designed to receive a value calculated by the second transportation vehicle component 20 based on the cryptographic key and a random number or a random string. In some exemplary embodiments, the control module 34 may be designed to receive the random number or random string as part of the at least one message from the second transportation vehicle component 20. Alternatively or additionally, the control module 34 may be designed to derive the random number or random string from a seed value. The control module 34 may be designed to compare the value received from the second transportation vehicle component 20 with a self-calculated value to authenticate the second transportation vehicle component 20.

In at least some exemplary embodiments, the control module 34 may be designed to authenticate the second transportation vehicle component 20 based on cryptographically protected messages of the second transportation vehicle component 20. For example, the cryptographically protected messages can be cryptographically signed. Alternatively or additionally, the cryptographically protected messages can be cryptographically encrypted. For example, the control module 34 may be designed to check a signature of the at least one received message and/or to decrypt the at least one received message to authenticate the second transportation vehicle component 20. If the signature or encryption of at least one received message corresponds to an expectation of the control module 34, the authentication of the second transportation vehicle component can be successful.

In at least some exemplary embodiments, the control module 34 may be designed to store cryptographic information about previously received cryptographically protected messages of the second transportation vehicle component 20. Alternatively, the control module 34 may be designed to obtain the cryptographic information during the manufacture of the transportation vehicle or when the first transportation vehicle component or the second transportation vehicle component is replaced. For example, the cryptographic information may contain information about a key used by the second transportation vehicle component 20. The control module 34 may be designed to authenticate the second transportation vehicle component 20 if cryptographically protected messages that were received within a predefined time interval before the release of the transportation vehicle component and which were received via the at least one interface 32 are consistent with the stored cryptographic information. For example, the control module 34 may be designed to compare a signature or an encryption with the cryptographic information to determine whether the signature or encryption is compatible with the cryptographic information. If it is compatible, the control module 34 can successfully authenticate the second transportation vehicle component, for example. Alternatively or additionally, the control module 34 may be designed to calculate a value based on the cryptographic information, and to compare the value with a value received from the second transportation vehicle component. If the values match, the control module 34 can successfully authenticate the second transportation vehicle component, for example.

Alternatively or additionally, the control module 34 may be designed to authenticate the second transportation vehicle component 20 by a plausibility check of the content of the at least one message. For example, the control module 34 may be designed to check whether the messages received from the second transportation vehicle component have content that is within an expected framework, or whether the messages received from the second transportation vehicle component have content that differs only within a tolerance range from the content of messages previously received from the transportation vehicle component 20, for example, based on numbering of messages. The control module 34 may be designed to ensure that all data that should be present as a result of the at least one message are also present and plausible. Plausibility checking can be implemented in such a way that it cannot be circumvented or falsified with little effort.

In at least some exemplary embodiments, the release of the first transportation vehicle component includes the activation or start of a regular operation of the first transportation vehicle component. For example, the control module 34 may be designed to change a state of the first transportation vehicle component 50 to "regular operation". For example, the regular operation of the first transportation vehicle component may be a state in which the first transportation vehicle component is fully functional. The first transportation vehicle component may take up the regular operation, for example, after an initialization of the first transportation vehicle component has taken place, which can include the release of the first transportation vehicle component.

In at least some exemplary embodiments, receiving the at least one message from the second transportation vehicle component 20 can already imply that the second transportation vehicle component 20 was released by the device 10. This may be the case, for example, if the second transportation vehicle component 20 (first/only) transmits at least one message to the first transportation vehicle component 50 or the device 30 after the successful release thereof by the device 10. Alternatively or additionally, the at least one message can imply that the second transportation vehicle component 20 has been released by the device 10 if the at least one message includes predefined information, for example, information that the second transportation vehicle component 20 has a predefined state or that a predefined action is performed by the second transportation vehicle component 20. For example, the at least one received message can imply that the second driving component 20 has been released by the device 10 if the at least one received message implies that the second transportation vehicle component 20 has a predefined state, such as a regular operation state or a released state. Alternatively or additionally, the at least one received message can imply that the second transportation vehicle component 20 was released by the device 10 if the at least one received message implies that the second transportation vehicle component 20 performs a predefined action, for example, that a start sequence of a drive component of the transportation vehicle is performed.

In at least some exemplary embodiments, the first transportation vehicle component can only be released after the second transportation vehicle component is released.

More details of the device 30 and/or the method of FIG. 2b are mentioned in connection with the concept or examples that were described above (for example, FIGS. 1a and 1b). The device 30 and/or the method of FIG. 2b may comprise one or more additional optional features corresponding to one or more facets of the proposed concept or the described examples as described previously or below.

Exemplary embodiments refer to a vehicle-to-vehicle control unit (also a vehicle-to-vehicle communication module) below by way of example. This can be the (second) transportation vehicle component 20 as introduced in conjunction with FIGS. 1a through 2b. The following exemplary embodiments are also applicable to further transportation vehicle components and are not limited to vehicle-to-vehicle control units. In general, the concept is also applicable to other systems with multiple components, such as an affiliation (of a computing unit) to a distributed network of computing units.

In at least some examples, the Car2Car (vehicle-to-vehicle) control unit can (or must) receive data from various other control units (for example, speed, steering angle, GPS position, etc.) in the context of its standard functionality (for example, its regular operation). These data can (or should) be transmitted authentically, i.e., cryptographically protected against manipulation. This may already be necessary for other reasons, for example, to avoid security problems. The transmitted data may correspond, for example, to the at least one message or the messages of the plurality of further transportation vehicle components.

The Car2Car control unit can already determine, for example, that other control units associated with the transportation vehicle are in the communication network, such as the plurality of further control units of FIGS. 1a and 1b, based on the fact that it receives cryptographically protected information in the course of its normal functional communication. For example, at least some of the control units can form the secured grouping of FIGS. 2a and 2b. An attacker would have to have removed them all and put them into operation so that the control unit could also function outside the transportation vehicle. This method can be qualitatively scalable by the need for additional actions (for example, terminal changing, WFS authentication, etc.) of the transportation vehicle to be authentically reported. It can be transitively scalable in that chains of actions that are themselves cryptographically secured must be carried out. Thus, the prerequisite for the decision to send can be scaled in at least some examples according to the requirements for the confidence level.

In at least some exemplary embodiments, no separate function is required to determine the grouping affiliation, this can be based, for example, on messages that the vehicle-to-vehicle control unit receives in regular operation. The possible overhead can be reduced or minimized, because the manipulation protection can refer to already existing communication and in some exemplary embodiments no extra messages need to be introduced exclusively for grouping authentication. In at least some exemplary embodiments, the system scales to any number of control units. The more other control units from which the Car2Car control unit receives protected function data, the more secure it may be to actually be in the transportation vehicle. In addition, content scalability can be provided by further control units and states. Cryptographic scalability can be provided by using more messages from different sources—more messages from different sources must be authenticated in some exemplary embodiments, which would have to be falsified to circumvent security (protection).

In addition, transitivity can be used. If other control units (transportation vehicle components) have other characteristics that safeguard their use in the transportation vehicle, this can be forwarded transitively. For example, if a control unit is part of the (cryptographically protected) immobilizer network (such as the secured grouping) and only begins sending the function data once it has established its own grouping affiliation (for example, it has been released based on the secured grouping), this characteristic can be automatically transferred to the Car2Car control unit (for example, the gearbox authenticates the BCM (body control module, a central control module in transportation vehicles) and can only send to the Car2Car control unit after the authentication→this allows the Car2Car control unit to know that the BCM is also authentic without even communicating with it itself).

An actuator, in the example the transmitting module in the C2C control unit, can (always) link its decision to send to a release state to be checked. This state is achieved, for example, (only) when certain authenticity actions have been performed, i.e., when cryptographically authenticated messages (such as the messages or the at least one message of FIGS. 1a through 2b) can be authenticated in the actuator control unit. These actions can be selected to scale the confidence level for the release.

For example, the Car2Car control unit can receive manipulation-protected data from control units that are particularly difficult to remove from the transportation vehicle, for example, gearbox or engine. In addition, there are control units that are already integrated into other authentication groupings (for example, in the secured grouping). In addition, the number of control units can be as large as possible. In addition, the cryptographic keys within the transportation vehicle may have sufficient spread (such as a large Hamming distance) so that the Car2Car control unit can clearly assign to each datum the control unit from which it comes (for example, for authenticating the second transportation vehicle component). In some examples, only when all these data or messages are authentically checked can the release for an action be given, in this case the sending of the C2C messages.

The data can be, but do not need to be, cryptographically protected. The Car2Car control unit may be designed to ensure that all data that should be present are also present and plausible. The plausibility checking can be implemented in such a way that it cannot be circumvented or falsified with little effort. In the case of cryptographically protected messages, the cryptographic keys can be the same in all control units to facilitate their initial distribution, wherein is can be ensured that the keys are not exposed by programming errors.

Figure 3A:
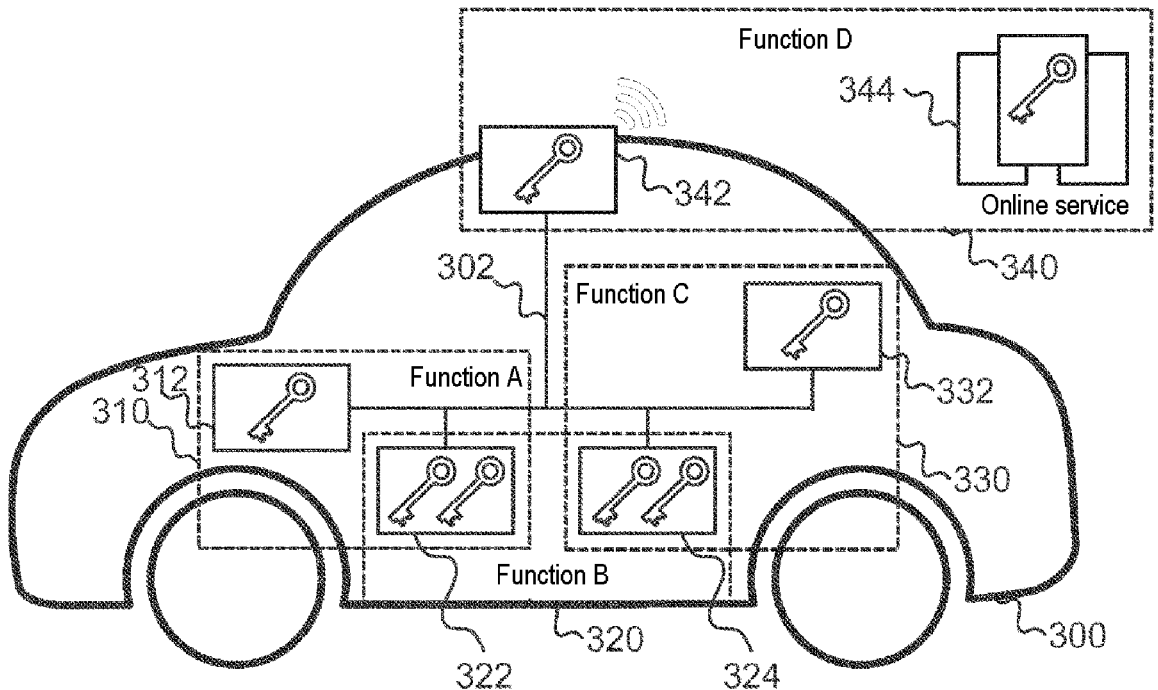
FIGS. 3a-3e show exemplary embodiments of a scalable grouping authentication.

FIG. 3a shows an exemplary embodiment of a scalable grouping authentication. In a transportation vehicle 300 four different functions A 310, B 320, C 330 and D 340 are implemented, wherein function D comprises a control unit 342 for communication with an online service 344. Functions A-D are each performed by control units with their own keys. Function A is based on control units 312 and 322, function B on control units 322 and 324, function C on control units 324 and 332 and function D on control unit 342. Each control unit comprises at least one key; control units that are assigned to more than one function (for example, 322; 324) can comprise more than one key. Communication between control units can be authenticated by the keys. For example, the control units can be loaded with keys during production. The control units 312, 322, 324, 332 and 342 are connected to each other via a common communication connection, such as a bus 302.

Figure 3B:
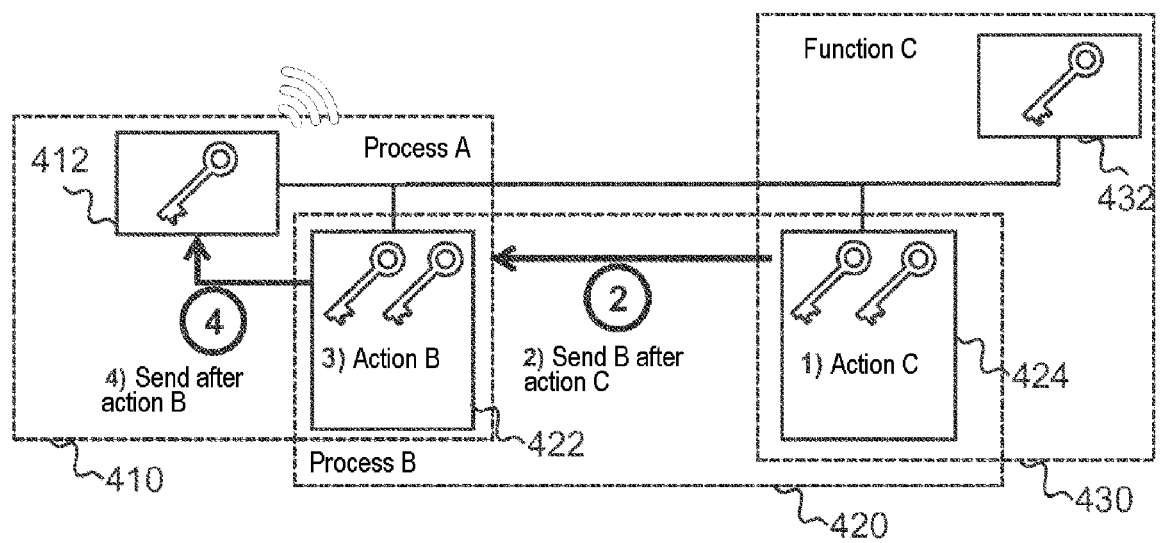

FIG. 3b shows an exemplary embodiment in which the release of a control unit is triggered by a transitivity of transportation vehicle actions (states). Process A 410 is based on the control units 412 (for example, a control unit for a communication) and the control unit 422, process B 420 is based on the control units 422 and 424, and function C 430 is based on the control units 424 and 432. Each control unit comprises at least one key; control units that are assigned to more than one function (for example, 422; 424) can comprise more than one key. Communication between the control units can be authenticated by the keys. The control units 412, 424 and 432 are connected to each other via a common communication connection, such as a bus. If function C is now executed (1) by control unit 424 (for example, control unit 424 released based on a secured grouping or based on a verification of the identities of a plurality of further transportation vehicle components) and control unit 422 is notified (2) about action C within the process B (for example, by the at least one message), then the control unit 422 can execute (3) action B (for example, the control unit 422 released as control unit 20) and can notify (4) control module 412 after the execution of action B (so that this can be released transitively), and thus enable a communication of the control module 412. Thus, a release can be triggered by sequentially executed actions in the transportation vehicle. An action, such as a terminal signal, can trigger the sending of an authentic message (for example, the message from control unit 424 to control unit 422, or the message from control unit 422 to control unit 412, which can correspond to the at least one message from FIGS. 2a and 2b), thus allowing the release of the control unit 412.

Figure 3C:
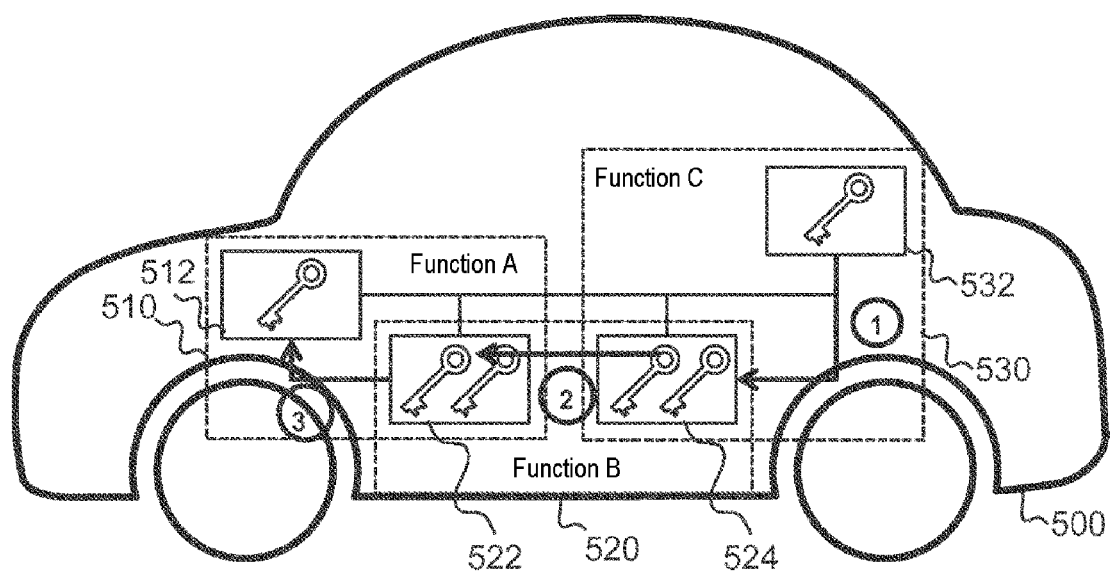

FIG. 3c shows an exemplary embodiment in which the release of a control unit is triggered by a transitivity of cryptographic operations. Successively executed cryptographic operations can be used by using different keys. A transportation vehicle 500 comprises the functions A 510, B 520 and C 530. Function A is based on the control units 512 and 522, function B is based on the control units 522 and 524 and function C is based on the control units 524 and 532. Each control unit comprises at least one key; control units that are assigned to more than one function (for example, 522; 524) can comprise more than one key. Communication between the control units can be authenticated by the keys. The control units are connected to each other via a common communication connection, such as a bus. In a first cryptographic operation (1), control unit 532 can release control unit 524 (for example, by authenticating the control unit 532 relative to control unit 524 by a cryptographically protected message), in a second cryptographic operation (2) control unit 524 can (transitively) release control unit 522 (for example, by authenticating control unit 524 relative to control unit 522 by at least one cryptographically protected message), and in a third cryptographic operation (3) control unit 522 can (transitively) release control unit 512 (as before). The cryptographic operations (1), (2) and (3) can build on each other, for example, being (mandatorily) carried out in this order. The cryptographic operations can include sending a cryptographic message and/or performing a cryptographic challenge-response procedure.

Figure 3D:
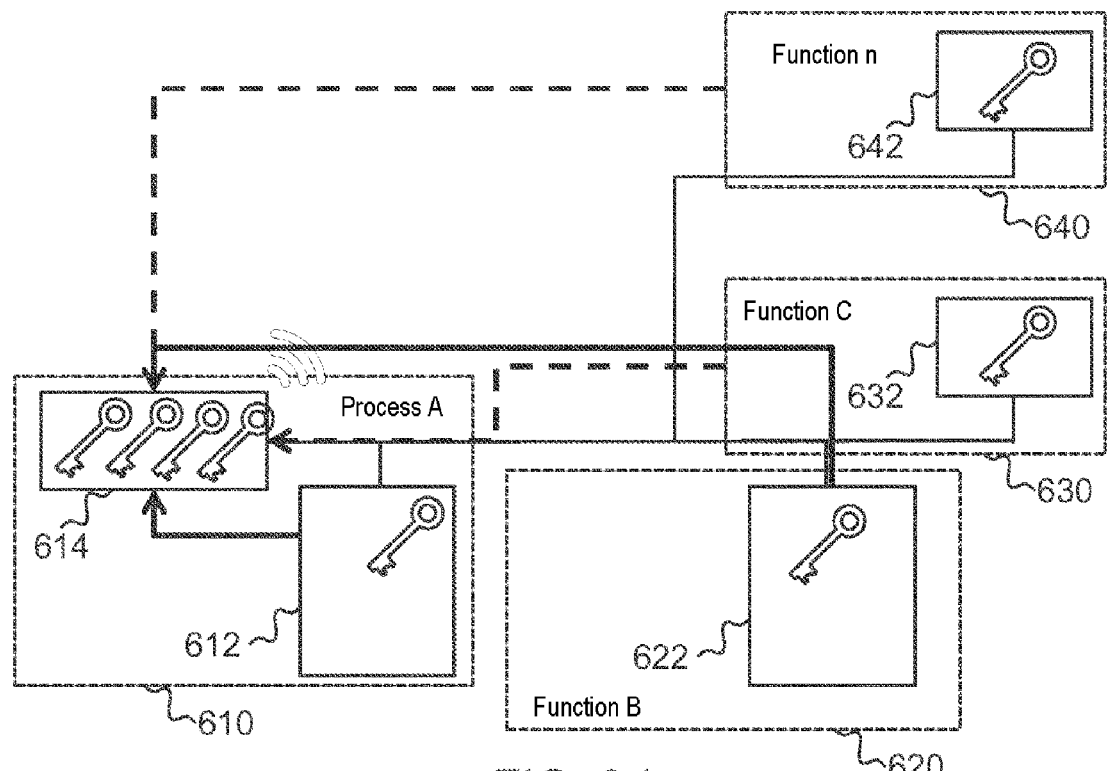

FIG. 3d shows a cryptographic scalability of the release of control units by sequentially performed actions in the transportation vehicle, wherein an action (for example, a terminal signal, . . . ) triggers the sending of an authentic message. The FIG. shows process A 610, function B 620, function C 630 and function n 640. Process A is based on the (to be released) control unit 614 and control unit 612, function B is based on control unit 622, function C is based on control unit 632 and function n is based on control unit 642. Each control unit comprises at least one key; if a control unit communicates with more than one other control unit (for example, the control unit 614 to be released communicates with the control units 612, 622, 632 and 642, then this control unit may contain several keys (for example, 4 keys). Communication between the control units can be authenticated by the keys. The control units are (at least partly) connected via a common communication connection, such as a bus. The control unit 614 to be released can be released—alternatively or cumulatively—based on cryptographic operations (which can be implemented similarly to the cryptographic operations of FIG. 3c) of the other control units 612, 622, 632, 642. For example, each of the control units 612, 622, 632 and 642 can each be part of a secured grouping or can be released based on the verification of the identities of a plurality of further transportation vehicle components. The control unit 614 may be designed to authenticate the control units 612, 622, 632 and 642, and if one (alternative release) or all (cumulative release) of them are released, can release itself.

Figure 3E:
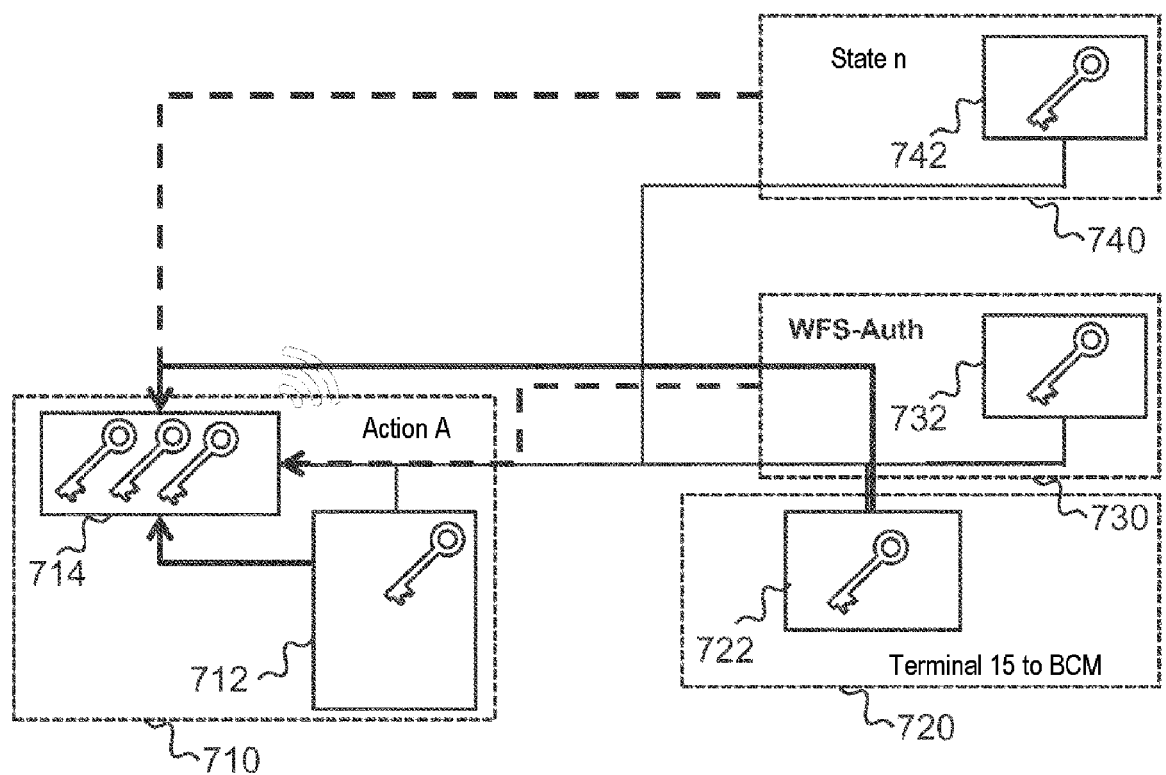

FIG. 3e shows a scalability of the release by transportation vehicle actions (states). The system can scale to any number of control units. The more other control units from which the Car2Car control unit receives protected functional data, the more secure it can be, for example, to actually be in the transportation vehicle. FIG. 3e shows action A 710 and functions B (terminal 15 to BCM) 720, C (immobilizer authentication) 730 and N (state n) 740. Action A is based on the control unit 714 to be released and the control unit 712, function B is based on control unit 722, function C is based on control unit 732 and function N is based on control unit 742. Each control unit comprises at least one key; if a control unit communicates with more than one other control unit (for example, control unit 714 to be released communicates with control units 712, 722, 732 and 742, then this control unit may contain several keys (for example, 4 keys). Communication between the control units can be authenticated by the keys. The control units are connected to each other (at least partly) via a common communication connection, such as a bus. The control unit 714 to be released can be released based on actions of the other control units 712, 722, 732, 742—alternatively or cumulatively. For example, each of the control units 712, 722, 732 and 742 can be part of a secured grouping or can be released based on a verification of identities of a plurality of further transportation vehicle components. Control unit 714 may be designed to authenticate the control units 712, 722, 732 and 742, and can release itself if one (alternative release) or all (cumulative release) of them are released. The scalability can be substantively achieved by further control units and states.

More details of the control units (transportation vehicle components) and/or transportation vehicles of FIGS. 3a through 3e are mentioned in connection with the concept or examples that were previously described (for example, FIGS. 1a through 2b). The control units or transportation vehicles may comprise one or more additional optional features corresponding to one or more facets of the proposed concept or the described examples as described previously or below.

Another exemplary embodiment is a computer program for performing at least one of the methods described above when the computer program is running on a computer, a processor, or a programmable hardware component. Another exemplary embodiment is also a digital storage medium, which is machine-readable or computer-readable, and which has electronically readable control signals, which can interact with a programmable hardware component in such a way that one of the methods described above is executed.

The features disclosed in the above description, the following claims and the attached figures can be important and may be implemented both individually and in any combination for the realization of an exemplary embodiment in the various configurations.

Although some properties have been described in connection with a device, it is understood that these properties also constitute a description of the corresponding method, so that a block or a component of a device is also to be understood as a corresponding process operation or as a feature of a process operation. Similarly, properties described in connection with or as a process operation also represent a description of a corresponding block or detail or feature of a corresponding device.

Depending on certain implementation requirements, exemplary embodiments may be implemented in hardware or in software. The implementation can be carried out with the use of a digital storage medium, such as a floppy disk, a DVD, a Blu-Ray disc, a CD, a ROM, a PROM, an EPROM, an EEPROM or a FLASH memory, a hard drive or other magnetic or optical memory on which electronically readable control signals are stored, which can interact with or do interact with a programmable hardware component in such a way that the respective method is performed.

A programmable hardware component can be formed by a processor, a central processing unit (CPU), a graphics processing unit (GPU), a computer, a computer system, an application-specific integrated circuit (ASIC), an integrated circuit (IC), a single-chip system (SOC=System on Chip), a programmable logic element or a field programmable gate array (FPGA) with a microprocessor.

The digital storage medium can therefore be machine-readable or computer-readable. Some exemplary embodiments thus comprise a data medium that has electronically readable control signals that are able to interact with a programmable computer system or a programmable hardware component in such a way that one of the methods described herein is performed. An exemplary embodiment is thus a data medium (or a digital storage medium or a computer-readable medium), on which the program for performing one of the methods described herein is recorded.

In general, exemplary embodiments may be implemented as a program, firmware, a computer program or a computer program product with a program code or as data, wherein the program code or the data is/are effective for performing one of the methods when the program is running on a processor or a programmable hardware component. The program code or the data may also be stored on a machine-readable medium or data medium, for example. The program code or data may be available inter alia as source code, machine code or byte code, and as other intermediate code.

A further exemplary embodiment is further a data stream, a signal sequence or a sequence of signals, which represents or represent the program for performing one of the methods described herein. The data stream, the signal sequence or the sequence of signals may be configured, for example, to be transferred over a data communication connection, such as over the Internet or another network. Exemplary embodiments are also signal sequences representing data which are suitable for sending over a network or a data communication connection, wherein the data represent the program.

A program according to an exemplary embodiment can implement one of the methods during its execution, for example, such that this reads memory locations or writes a data item or multiple data into memory locations, whereby optionally switching operations or other operations are caused in transistor structures, in amplifier structures or in other electrical, optical, or magnetic components or components working according to another functional principle. Accordingly, data, values, sensor values or other information can be captured, determined or measured by a program by reading a memory location. A program can therefore capture, determine or measure variables, values, measurement variables and other information by reading from one or more memory locations, and can bring about, initiate, or perform an action and control other devices, machines, and components by writing to one or more memory locations.

The exemplary embodiments described above are merely an illustration of the principles of the present disclosure. It is understood that modifications and variations of the arrangements and details described herein will be obvious to other professionals. Therefore, it is intended that the disclosure is limited only by the scope of protection of the following claims and not by the specific details presented herein on the basis of the description and the explanation of the exemplary embodiments.

REFERENCE CHARACTER LIST

10 Device
12 Interface
14 Control module
20 (Second) transportation vehicle component
30 Device
32 Interface
34 Control module
50 First transportation vehicle component
100 Transportation vehicle
110 Receiving messages
120 Verifying an identity
130 Releasing the (second) transportation vehicle component
210 Receiving at least one message
220 Authenticating the second transportation vehicle component
230 Releasing the first transportation vehicle component
300 Transportation vehicle
302 Common communication connection bus
310 Function A
312 Control unit
320 Function B
322 Control unit
324 Control unit
330 Function C
332 Control unit
340 Function D
342 Control unit
410 Process A
412 Control unit
420 Process B
422 Control unit
424 Control unit
430 Function C
432 Control unit
500 Transportation vehicle
510 Function A
512 Control unit
520 Function B
522 Control unit
524 Control unit
530 Function C
532 Control unit
610 Process A
612 Control unit
620 Function B
622 Control unit
630 Function C
632 Control unit
640 Function n
642 Control unit
710 Process A
712 Control unit
720 Function B
722 Control unit
730 Function C
732 Control unit
740 Function n
742 Control unit

The invention claimed is:
1. A device for releasing a vehicle component of a transportation vehicle, the device comprising:
at least one interface for communication with a plurality of further vehicle components of the transportation vehicle; and a control module comprising program code and stored on a non-transitory computer readable medium, for:
controlling the at least one interface,
receiving messages of the plurality of further vehicle components of the transportation vehicle,
verifying an identity of the plurality of further vehicle components of the transportation vehicle based on the received messages and based on stored identification data for the plurality of further vehicle components, wherein the messages on which the verification of the identity of the plurality of further vehicle components is based are messages that are used for operation of the functionality of the respective vehicle component other than for the purposes of verification of the vehicle component identity, and
releasing the vehicle component in response to the identity of the plurality of further vehicle components being consistent with the stored identification data of the plurality of further vehicle components.

2. The device of claim 1, wherein the control module verifies the identity of the plurality of further vehicle components based on the messages of the plurality of further vehicle components that pertain to operation of the functionality of the respective vehicle components, wherein the messages are cryptographically protected messages.

3. The device of claim 2, wherein the cryptographically protected messages are cryptographically signed, wherein the cryptographically protected messages are cryptographically encrypted, and/or wherein the cryptographically protected descendants comprise a value calculated based on a cryptographic key.

4. The device of claim 2, wherein the identification data of the plurality of further vehicle components include cryptographic information about the plurality of further vehicle components, and wherein the verification of the identity of the plurality of further vehicle components is successful in response to the cryptographically protected messages of the plurality of further vehicle components being consistent with the stored cryptographic information.

5. The device of claim 4, wherein the verification of the identity of the plurality of further vehicle components is successful in response to a proportion of cryptographically protected messages of the plurality of further vehicle components received within a predefined time interval that are consistent with the stored cryptographic information being greater than a confidence threshold.

6. The device of claim 1, wherein the control module verifies the identity of the plurality of further vehicle components by a plausibility check of a content of the received messages.

7. The device of claim 1, wherein the messages on which the verification of the identity of the plurality of further vehicle components is based are messages which are not received via the at least one interface exclusively for the purpose of verifying the identity of the plurality of further vehicle components.

8. The device of claim 1, wherein the plurality of other vehicle components includes a drive motor of the transportation vehicle and/or a gearbox of the transportation vehicle, and/or wherein the plurality of further vehicle components includes at least three vehicle components of the transportation vehicle.

9. The device of claim 1, wherein at least one vehicle component of the plurality of other product components is part of a secured grouping of vehicle components of the transportation vehicle.

10. The device of claim 1, wherein the vehicle component is a vehicle-to-vehicle communication module, and wherein the received messages on which the verification of the identity of the plurality of other product components is based contain at least one element of the group consisting of position data of a navigation satellite system for determining the position of the transportation vehicle, steering angle information of the transportation vehicle and speed information of the transportation vehicle, and wherein a vehicle-to-vehicle communication of the vehicle-to-vehicle communication module is based on the release of the vehicle-to-vehicle communication module.

11. A vehicle-to-vehicle communication module comprising the device of claim 1.

* * * * *